(12) United States Patent
Hoke et al.

(10) Patent No.: US 9,440,192 B2
(45) Date of Patent: *Sep. 13, 2016

(54) DIESEL OXIDATION CATALYST AND USE THEREOF IN DIESEL AND ADVANCED COMBUSTION DIESEL ENGINE SYSTEMS

(75) Inventors: Jeffrey B. Hoke, North Brunswick, NJ (US); Joseph C. Dettling, Howell, NJ (US)

(73) Assignee: BASF Corporation, Florham Park, NJ (US)

( * ) Notice: Subject to any disclaimer, the term of this patent is extended or adjusted under 35 U.S.C. 154(b) by 737 days.

This patent is subject to a terminal disclaimer.

(21) Appl. No.: 12/687,345

(22) Filed: Jan. 14, 2010

(65) Prior Publication Data
US 2010/0183490 A1  Jul. 22, 2010

Related U.S. Application Data

(60) Provisional application No. 61/145,408, filed on Jan. 16, 2009.

(51) Int. Cl.
| | |
|---|---|
| *B01D 53/94* | (2006.01) |
| *B01J 23/63* | (2006.01) |
| *B01J 35/00* | (2006.01) |
| *B01J 37/02* | (2006.01) |
| *F01N 3/035* | (2006.01) |

(Continued)

(52) U.S. Cl.
CPC ............. *B01D 53/945* (2013.01); *B01J 23/63* (2013.01); *B01J 35/0006* (2013.01); *B01J 37/0244* (2013.01); *B01J 37/0246* (2013.01); *F01N 3/035* (2013.01); *F01N 3/10* (2013.01); *B01D 53/9477* (2013.01); *B01D 2255/1021* (2013.01); *B01D 2255/1023* (2013.01); *B01D 2255/206* (2013.01); *B01D 2255/2092* (2013.01); *B01D 2255/20707* (2013.01); *B01D 2255/20715* (2013.01); *B01D 2255/30* (2013.01); *B01D 2255/502* (2013.01); *B01D 2255/504* (2013.01); *B01D 2255/9022* (2013.01); *B01D 2258/012* (2013.01); *B01D 2258/014* (2013.01); *B01J 35/04* (2013.01); *F01N 2510/063* (2013.01); *F01N 2510/0682* (2013.01); *F01N 2510/0684* (2013.01); *Y02T 10/22* (2013.01)

(58) Field of Classification Search
None
See application file for complete search history.

(56) References Cited

U.S. PATENT DOCUMENTS

| | | |
|---|---|---|
| 4,329,162 A | 5/1982 | Pitcher, Jr. |
| 4,335,023 A | 6/1982 | Dettling et al. |
| 4,929,581 A | 5/1990 | Steinwandel et al. |

(Continued)

FOREIGN PATENT DOCUMENTS

| | | |
|---|---|---|
| EP | 0782880 A1 | 7/1997 |
| WO | WO-2008/042084 A1 | 4/2008 |

*Primary Examiner* — Melvin C Mayes
*Assistant Examiner* — Michael Forrest
(74) *Attorney, Agent, or Firm* — Womble Carlyle Sandridge & Rice LLP

(57) ABSTRACT

An oxidation catalyst composite, methods and systems for the treatment of exhaust gas emissions from an advanced combustion engine, such as the oxidation of unburned hydrocarbons (HC), and carbon monoxide (CO) and the reduction of nitrogen oxides (NOx) from a diesel engine and an advanced combustion diesel engine are disclosed. More particularly, washcoat compositions are disclosed comprising at least two washcoat layers, a first washcoat comprising a palladium component and a first support containing cerium and a second washcoat containing platinum and one or more molecular sieves.

21 Claims, 4 Drawing Sheets

(51) Int. Cl.
*F01N 3/10* (2006.01)
*B01J 35/04* (2006.01)

(56) References Cited

U.S. PATENT DOCUMENTS

| | | | |
|---|---|---|---|
| 4,961,917 A | 10/1990 | Byrne | |
| 5,125,231 A | 6/1992 | Patil et al. | |
| 5,202,299 A | 4/1993 | Symons et al. | |
| 5,407,880 A | 4/1995 | Ikeda et al. | |
| 5,462,907 A | 10/1995 | Farrauto et al. | |
| 5,491,120 A | 2/1996 | Voss et al. | |
| 5,516,497 A | 5/1996 | Speronello et al. | |
| 5,531,972 A | 7/1996 | Rudy | |
| 5,627,124 A | 5/1997 | Farrauto et al. | |
| 5,676,912 A * | 10/1997 | Sharma et al. | 423/213.2 |
| 5,677,258 A * | 10/1997 | Kurokawa et al. | 502/303 |
| 5,772,972 A | 6/1998 | Hepburn et al. | |
| 5,782,087 A * | 7/1998 | Kinugasa et al. | 60/276 |
| 6,047,544 A | 4/2000 | Yamamoto et al. | |
| 6,093,378 A | 7/2000 | Deeba et al. | |
| 6,110,862 A | 8/2000 | Chen et al. | |
| 6,171,556 B1 | 1/2001 | Burk et al. | |
| 6,274,107 B1 | 8/2001 | Yavuz et al. | |
| 6,444,610 B1 | 9/2002 | Yamamoto | |
| 6,471,924 B1 | 10/2002 | Feeley et al. | |
| 6,667,018 B2 * | 12/2003 | Noda et al. | 423/213.5 |
| 6,677,264 B1 * | 1/2004 | Klein | B01D 53/945 502/326 |
| 6,708,484 B2 | 3/2004 | Onodera et al. | |
| 6,775,972 B2 * | 8/2004 | Twigg et al. | 60/275 |
| 7,189,376 B2 | 3/2007 | Kumar et al. | |
| 7,246,488 B2 | 7/2007 | Takaya et al. | |
| 7,250,385 B1 | 7/2007 | Ohno et al. | |
| 7,947,238 B2 * | 5/2011 | Deeba | 423/213.2 |
| 2003/0061860 A1 | 4/2003 | Hu et al. | |
| 2003/0182932 A1 * | 10/2003 | Miura et al. | 60/284 |
| 2004/0001781 A1 * | 1/2004 | Kumar et al. | 422/180 |
| 2004/0001782 A1 * | 1/2004 | Kumar et al. | 422/180 |
| 2005/0282701 A1 * | 12/2005 | Foong | B01D 53/945 502/304 |
| 2007/0191219 A1 | 8/2007 | Fujita et al. | |
| 2008/0045405 A1 | 2/2008 | Beutel et al. | |
| 2008/0219906 A1 | 9/2008 | Chen et al. | |

* cited by examiner

DIESEL OXIDATION CATALYST AND USE THEREOF IN DIESEL AND ADVANCED COMBUSTION DIESEL ENGINE SYSTEMS

CROSS REFERENCE TO RELATED APPLICATIONS

This application claims the benefit of priority under 35 U.S.C. §119(e) to U.S. Provisional Application Ser. No. 61/145,408, filed Jan. 16, 2009, which is incorporated herein by reference.

TECHNICAL FIELD

Embodiments of the present invention are directed to oxidation catalysts. More specifically, embodiments are directed to catalyst formulations comprising Pd and Ce-containing precious metal supports and their use for reducing carbon monoxide and hydrocarbons in diesel engine and advanced combustion diesel engine systems.

BACKGROUND

Operation of lean burn engines, e.g., diesel engines and lean burn gasoline engines, provide the user with excellent fuel economy, and compared to spark-ignited stoichiometric gasoline engines, have significantly lower emissions of gas phase hydrocarbons and carbon monoxide due to their operation at high air/fuel ratios under fuel lean conditions. Emissions of diesel engines include particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others.

There are major differences between catalyst systems used to treat diesel engine exhaust gas and gasoline engine exhaust gas. A significant difference between the two types of engines and their operation is that gasoline engines are spark ignited and operate within a stoichiometric air to fuel ratio, and diesel engines are compression ignition engines that operate with a large excess of air. The emissions from these two types of engines are very different and require completely different catalyst strategies. Generally, the treatment of diesel emissions is more complicated than gasoline engine emissions treatment due to the formation of high amounts of NOx and particulate matter in diesel engines.

The two major components of exhaust particulate matter are the soluble organic fraction (SOF) and the soot fraction (soot). The SOF condenses on the soot in layers, and is derived from unburned diesel fuel and lubricating oils. The SOF can exist in diesel exhaust either as a vapor or as an aerosol (fine droplets of liquid condensate) depending on the temperature of the exhaust gas. Soot is predominately composed of particles of carbon. The particulate matter from diesel exhaust is highly respirable due to its fine particle size, which poses health risks at higher exposure levels. Moreover, the SOF contains polycyclic aromatic hydrocarbons, some of which are suspected carcinogens.

Diesel engines utilizing new advanced combustion technologies such as Homogeneous Charge Compression Ignition (HCCI) or Hydraulic Activated Diesel Injectors (HADI) will be able to reduce engine out $NO_x$ and particulate matter (PM) emissions by reducing the combustion flame temperature within the engine cylinder and by increasing the uniformity and mixing of the fuel charge prior to ignition. Generally, the exhaust gas prior to any treatment emitted contains significantly reduced particulate matter and $NO_x$ as compared to the exhaust gas emitted from traditional diesel engines. In some instances, the $NO_x$ emission from such advanced combustion diesel engines is two to three times lower than the emissions from traditional diesel engines. However, in the process of changing the combustion process to lower $NO_x$ and PM emissions, the overall quantity of CO and hydrocarbon (HC) emissions will increase, the nature of the HCs formed will change (e.g. more methane may be produced), and the exhaust temperature may be lowered. In some instances, the CO and HC emissions from advanced combustion diesel engines is 50% to about 100% higher than the HC and CO emissions from traditional diesel engines. Since these exhaust characteristics will create significant challenges for current diesel emission catalyst technology, new catalyst formulations are needed in order to meet increasingly stringent environmental regulations such as Euro 6.

Oxidation catalysts comprising a precious metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters or catalyzers, which are placed in the exhaust flow path from diesel power systems to treat the exhaust before it vents to the atmosphere. Typically, the diesel oxidation catalysts are formed on ceramic or metallic substrate carriers (such as the flow-through monolith carrier, as described herein below) upon which one or more catalyst coating compositions are deposited. In addition to the conversions of gaseous HC and CO emissions and particulate matter (SOF portion), oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. Oxidation catalysts comprising a platinum group metal dispersed on a refractory metal oxide support are known for use in treating exhaust gas emissions from diesel engines. Platinum (Pt) is an effective metal for oxidizing CO and HC in a DOC after high temperature aging under lean conditions and in the presence of fuel sulfur. Despite the lower cost of Pd compared to Pt, Pd-based DOC catalysts typically show higher light-off temperatures for oxidation of CO and HC, especially when used to treat exhaust containing high levels of sulfur (from high sulfur containing fuels) or when used with HC storage materials, potentially causing a delay in HC and/or CO light-off "Light-off" temperature for a specific component is the temperature at which 50% of that component reacts. Pd-containing DOCs may poison the activity of Pt to convert hydrocarbons and/or oxidize $NO_x$ and may also make the catalyst more susceptible to sulfur poisoning. These characteristics have typically prevented the use of Pd as an oxidation catalyst in lean burn operations, especially for light duty diesel applications where engine temperatures remain below 250° C. for most driving conditions.

Although platinum (Pt) has good light-off characteristics for CO and HC and, therefore, has historically been the preferred precious metal of choice for catalyst compositions used to abate diesel engine exhaust, palladium (Pd) recently has become of greater interest due to its relatively lower cost. Palladium has proven to be suitable in DOC catalysts in conjunction with platinum to reduce the required amount of platinum, despite it being somewhat less reactive on a weight basis. Due to the lower reactivity of palladium in DOC catalysts, it is important to ensure that it is located in the DOC catalyst in a way that does not inhibit its performance.

Oxygen storage components such as cerium are not typically mixed with DOCs because the combination would result in the platinum remaining in the oxidized state. Since normal diesel engines operate under constantly lean conditions, the platinum would have no opportunity to be reduced to the active metallic form.

As emissions regulations become more stringent, there is a continuing goal to develop diesel oxidation catalyst systems that provide improved performance, for example, light-off performance. There is also a goal to utilize components of DOCs, for example, the hydrocarbon storage components (e.g. zeolites) and palladium, as efficiently as possible.

SUMMARY

One aspect of the present invention is directed to a catalyst composite or catalytic article for abatement of exhaust gas emissions from a diesel engine. Various embodiments are listed below. It will be understood that the embodiments listed below may be combined not only as listed below, but in other suitable combinations in accordance with the scope of the invention.

In embodiment one, the catalyst composite comprises: a carrier substrate having a length, an inlet end and an outlet end, a diesel oxidation catalyst catalytic material on the carrier, the diesel oxidation catalyst catalytic material including a first washcoat layer and a second washcoat layer, the first washcoat layer comprising a palladium (Pd) component and first refractory metal oxide support including cerium, the first washcoat layer being substantially free of a molecular sieve; and the second washcoat layer comprising a second refractory oxide support, a platinum component and a molecular sieve, the second washcoat layer being substantially free of palladium.

Embodiment two includes a modification to the catalyst composite of embodiment one, wherein the first layer is substantially free of platinum.

Embodiment three is directed to a modification of catalyst composite embodiment one or two, wherein the first refractory metal oxide support further comprises one or more of alumina, silica, zirconia, titania and combinations thereof and the second refractory oxide support comprises one or more of alumina, silica, zirconia, titania and combinations thereof.

Embodiment four is directed to a modification of catalyst composite embodiment three wherein the molecular sieve comprises a zeolite.

Embodiment five is directed to a modification of catalyst composite embodiment two, further comprising an undercoat layer containing substantially no precious group metal component.

Embodiment six is directed to a modification of catalyst composite embodiment two, wherein the first washcoat layer extends over the entire length of the substrate and the second washcoat layer completely overlaps the first washcoat layer.

Embodiment seven is directed to a modification of catalyst composite embodiment two, wherein the first washcoat layer is upstream from and adjacent to the second washcoat layer along the length of the carrier substrate.

Embodiment eight is directed to a modification of catalyst composite embodiment seven, wherein the first washcoat layer extends from the inlet end along about 5% to 95% of the length of the substrate and the second washcoat layer extends from the outlet along about 5% to 95% of the length of the substrate.

Embodiment nine is directed to a modification of catalyst composite embodiment eight, wherein the first layer at least partially overlaps the second washcoat layer.

Embodiment ten is directed to a modification of catalyst composite embodiment eight, wherein the second washcoat layer at least partially overlaps the first washcoat layer.

Embodiment 11 is directed to a modification of catalyst composite embodiment two, wherein the platinum and palladium are present in a platinum to palladium ratio of from about 1:10 to about 10:1.

Embodiment 12 is directed to a modification of catalyst composite embodiment two, wherein the platinum and palladium are present in a platinum to palladium ratio of from about 1:4 to about 2:1. It will be understood that any of embodiments one through ten can be modified by varying the precious metal ratios described in embodiments 11 and 12.

Embodiment 13 is a modification of catalyst composite embodiment one, wherein the first washcoat layer further comprises a second platinum component.

Embodiment 14 is a modification of catalyst composite embodiment one 13, wherein the second platinum component, and at least a portion of the palladium component are supported on a refractory oxide support comprising one or more of alumina, silica, zirconia, titania and combinations thereof.

Embodiment 15 is a modification of catalyst composite embodiment one 13, wherein the first refractory metal oxide support further comprises one or more of alumina, silica, zirconia, titania and combinations thereof and the second refractory oxide support comprises one or more of alumina, silica, zirconia, titania and combinations thereof.

Embodiment 16 is a modification of catalyst composite embodiment 15, wherein the molecular sieve comprises a zeolite.

Embodiment 17 is a modification of catalyst composite embodiment one, further comprising an undercoat layer containing substantially no precious group metal component.

Embodiment 18 is a modification of catalyst composite embodiment 13, wherein the first washcoat extends over the entire length of the substrate and the second washcoat completely overlaps the first washcoat.

Embodiment 19 is a modification of catalyst composite embodiment 13, wherein the first washcoat layer is upstream from and adjacent to the second washcoat layer along the length of the carrier substrate.

Embodiment 20 is a modification of catalyst composite embodiment 19, wherein the first washcoat layer extends from the inlet end along about 5% to 95% of the length of the substrate and the second washcoat layer extends from the outlet along about 5% to 95% of the length of the substrate.

Embodiment 21 is a modification of catalyst composite embodiment 20, wherein the first layer at least partially overlaps the second washcoat layer.

Embodiment 22 is a modification of catalyst composite embodiment 20, wherein the second washcoat layer at least partially overlaps the first washcoat layer.

Embodiment 23 is a modification of catalyst composite embodiment 13, wherein the platinum and palladium are present in a platinum to palladium ratio of from about 1:10 to about 10:1.

Embodiment 24 is a modification of catalyst composite embodiment 13, wherein the platinum and palladium are present in a platinum to palladium ratio of from about 1:4 to about 2:1. It will be understood that the precious metal content of any of embodiments 13 to 22 can be modified in accordance with the ranges recited in embodiments 23 and 24.

Embodiment 25 is a modification of catalyst composite embodiment one, wherein the catalyst is effective to oxidize HC and CO emitted from an advanced combustion diesel engine, including a methane component, the first layer being active for oxidizing CO and HCs under high emission and low temperature conditions associated with advanced combustion diesel engine operation.

Embodiment 26 is a modification of catalyst composite embodiment one 1, wherein the first support comprises ceria and the molecular sieve comprises a zeolite selected from beta-zeolite, ZSM-5, zeolite-Y or combinations thereof.

Embodiment 27 is a modification of any of embodiments 1-26, wherein the total loading of the platinum and palladium is in the range of about 30 g/ft$^3$ to 210 g/ft$^3$.

Another aspect of the invention is directed to a method of treating diesel engine exhaust gas. Yet another aspect of the invention is directed to a method for the treatment of advanced combustion diesel engine exhaust gas. The method comprises contacting the exhaust gas stream with a diesel oxidation catalyst composite of any of embodiments 1-27.

In a variant on the method embodiments, the diesel exhaust gas stream can be directed to a soot filter located downstream of the diesel oxidation catalyst composite. In still a further variant on the method embodiments, the exhaust gas can be directed to a selective catalytic reduction (SCR) catalytic article located upstream or downstream of the diesel oxidation catalyst or the catalyzed soot filter (CSF).

Still another aspect of the invention is directed to a system for the treatment of diesel engine exhaust gas or advanced combustion diesel engine exhaust gas. The system can include any of the catalyst composite embodiments described above (1-26), and one or more of a soot filter, a catalyzed soot filter, a selective catalytic reduction (SCR) catalytic article and a $NO_x$ storage and reduction (NSR) catalytic article.

DETAILED DESCRIPTION

Figure 1:
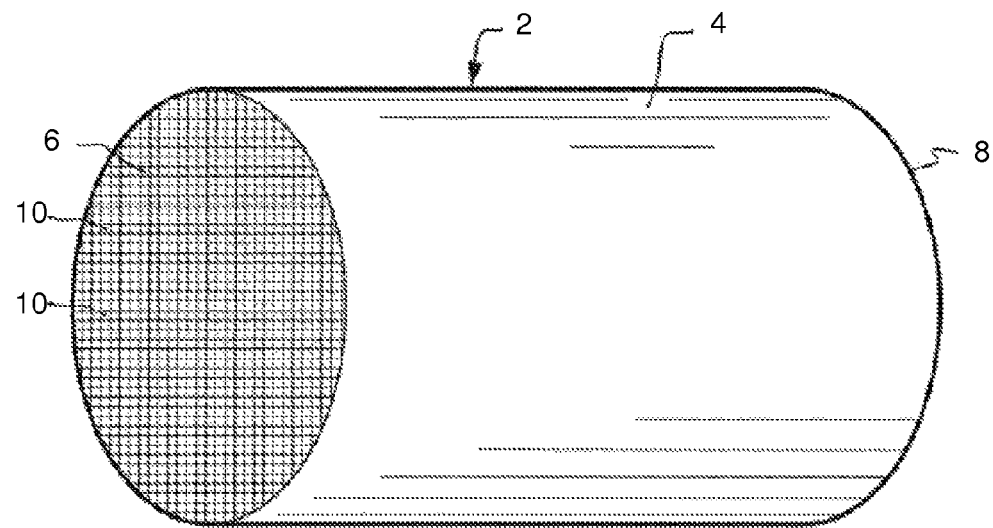
FIG. 1 is a perspective view of a honeycomb-type refractory carrier member which may comprise a novel diesel oxidation catalyst (DOC) washcoat composition in accordance with the present invention.

Before describing several exemplary embodiments of the invention, it is to be understood that the invention is not limited to the details of construction or process steps set forth in the following description. The invention is capable of other embodiments and of being practiced or being carried out in various ways.

According to one or more embodiments, by placing Pd in close proximity to the Ce component, namely, supporting the Pd on cerium-containing support and preventing contact between Pt and Ce (either within the same or different washcoat layers), both precious metal functions can be kept active under both sets of operating conditions encountered by advanced combustion diesel engines (i.e. both low and high emissions). In another embodiment of the invention, and while not wishing to be bound by a particular theory, by providing active Pd/Ce sites for oxidizing CO and HCs under the high emission and low temperature conditions associated with advanced combustion diesel engines where Pt may be self-inhibited by high levels of CO, the localized heat released at the Pd/Ce sites can be used to assist in the oxidation of the more refractory methane component of the diesel exhaust. Even though the inlet exhaust gas temperatures to the oxidation catalyst typically are not sufficient to oxidize methane alone, the burning of the other components within the exhaust is sufficient to generate a localized exotherm to remove the methane. In a further embodiment of the invention, by combining the Pd and Ce components and thereby producing an activated form of Pd for HC oxidation, the need for large amounts of zeolite trapping material may not be necessary. As a result, the issue of matching zeolite HC release with catalyst light-off may be minimized.

The scope of this invention includes all formulations comprising Ce-containing precious metal support and Pd on a Ce-containing support, for example ceria or ceria-zirconia. Although other precious metals (i.e. Pt, Rh) or oxide support materials (e.g. alumina, silica-alumina, silica, zirconia, or titania) may be incorporated into the formulation, one feature of the invention is that Pd comes into close proximity with the Ce-containing support or a Ce additive. One example of a support covered by the invention is high surface area ceria which has been stabilized against high temperature thermal degradation using oxide materials such as alumina, zirconia, silica, lanthana, etc., either alone or in combination and at a loading between 0.5 to 30% of the total weight of the support. Another example is ceria that has been stabilized in a zirconia matrix with additional additives such as Y, La, Nd, Sm, Pr, and mixtures thereof, where the ceria is present in an amount over 20%. In order to facilitate the contacting of the gaseous components with the active solid catalytic particles of Pd/Ce, it is proposed that the Pd/ceria composite be a submicron particle within the washcoat. Further enhancement of catalyst activity may be achieved by the addition of alkaline earth oxides (e.g. Mg, Sr, Ba, etc.), rare earth oxides (e.g. La, Y, Nd, etc.), reducible base metal oxides (e.g. V, Mn, Fe, etc.), and other base metal oxides (e.g. Sn, Zn, Ti, etc.) to one or more of the washcoat layers. In addition, any number of a wide variety of washcoat designs employing layered or zone-coated architectures of the Pd/Ce complex in combination with a Pt/Pd or Pt-only function is envisioned for optimizing performance for specific applications. Depending on the overall exhaust emission system configuration, it is conceived that the Pd/Ce complex disclosed herein can be applied to either a DOC monolith or a catalyzed filter or combinations of both. In particular, application of the Pd/Ce complex to a close-couple CSF may enhance passive burning of trapped soot due to the large exotherm generated by the active catalytic species under conditions of high CO and HC.

In one or more embodiments, the first washcoat layer is substantially free of alumina and platinum. However, in other embodiments, the first washcoat layer may contain a refractory oxide support such as alumina, silica, zirconia, titania and combinations thereof, which may support Pt and a portion of the Pd, provided the Pt is not in contact with Ce. In one or more embodiments, the second washcoat layer is substantially free of an oxygen storage component. In one or more embodiments, the second washcoat layer is substantially free of palladium. In one or more embodiments, the first washcoat layer is substantially free of molecular sieves or zeolites. In one or more embodiments, the second washcoat layer is substantially free of non-zeolite supported-precious metal components. In one or more embodiments, one or more of the first washcoat layer and the second washcoat layer are substantially free of non-precious metal components. In one or more embodiments, the diesel oxidation catalyst material is substantially free of base metals in quantities suitable for NOx (nitrogen oxides) storage; such base metals include, but are not limited to Ba, Mg, K, and La, and the like. In other embodiments, the catalytic material is free of rhodium. In one or more embodiments, the zeolite comprises a beta-zeolite, ZSM-5, zeolite-Y or combinations thereof.

In particular embodiments of the invention, the catalyst composite, catalyst systems and methods are particularly suited for treating the exhaust gas emissions from an advanced combustion diesel engine exhaust characterized by and distinguished from traditional diesel engine exhaust as having higher emissions of HC and CO (in some instances 50% to 100% higher) and lower emissions of $NO_x$ (in some instances two to three times lower) than traditional diesel engines. As such, one embodiment of the invention pertains to an oxidation catalyst composite for the treatment of exhaust gas emissions of an advanced combustion diesel engine, comprising a carrier substrate having a length, an inlet end and an outlet end, a diesel oxidation catalyst on the carrier, the diesel oxidation catalyst including a first washcoat layer and a second washcoat layer, the first washcoat layer comprising a first refractory metal oxide support including cerium and a palladium (Pd) component, the first washcoat layer being substantially free of a molecular sieve and platinum; and the second washcoat layer comprising a second refractory oxide support, a platinum component and a molecular sieve, the second washcoat layer being substantially free of palladium, wherein the catalyst composite is effective to oxidize HC and CO emitted from an advanced combustion diesel engine. The HC includes a methane component. In a more specific embodiment, the first layer contains Pd supported on cerium-containing support and is active for oxidizing CO and HCs under the high emission and low temperature conditions associated with advanced combustion engine operation, and heat released from oxidation of CO and HC over the cerium-containing support is available to contribute to oxidation of the methane component of the diesel exhaust. According to one embodiment, the burning of the exhaust gas components within the exhaust is sufficient to generate a localized exotherm sufficient to oxidize the methane component Reference to a catalyst composite or catalytic article means a catalytic article including a carrier substrate, for example a honeycomb substrate, having one or more washcoat layers containing a catalytic component, for example, a precious group metal component that is effective to catalyze the oxidation of HC, CO and/or $NO_x$.

Reference to "essentially no," "essentially free," and "substantially free" means that the material recited is not intentionally provided in the recited layer. It is recognized, however, that the material may migrate or diffuse to the recited layer in minor amounts considered to be insubstantial (that is <10% of the material, 9%, 8%, 7%, 6%, 5%, 4%, 3%, 2%, or even 1%).

Refractory metal oxide supports refer to support particles having pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability or performance enhancement of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption.

As used herein, molecular sieves, such as zeolites, refers to materials, which may in particulate form support catalytic precious group metals, the materials having a substantially uniform pore distribution, with the average pore size being no larger than 20 Å. Reference to a "non-zeolite-support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, zirconia-titania.

Reference to "impregnated" means that a precious metal-containing solution is put into pores of a material such as a zeolite or a non-zeolite-support. In detailed embodiments, impregnation of precious metals is achieved by incipient wetness, where a volume of diluted precious metal-containing solution is approximately equal to the pore volume of the support bodies. Incipient wetness impregnation generally leads to a substantially uniform distribution of the solution of the precursor throughout the pore system of the material. Other methods of adding precious metal are also known in the art and can be used.

Reference to OSC (oxygen storage component) refers to an entity that has multi-valence state and can store and release molecular oxygen under exhaust conditions. Typically, an oxygen storage component will comprise one or more reducible oxides of one or more rare earth metals. Examples of suitable oxygen storage components include ceria, zirconia and combinations thereof. Praseodymia can also be included as an OSC or a promoter. The OSC may include one or more promoters or modifiers, such as Y, La, Nd, Sm, Pr, and combinations thereof.

Reference to "advanced combustion diesel engine" is distinguished from a traditional diesel engine, and includes Homogeneous Charge Compression Ignition (HCCI), Premixed Charge Compression Ignition (PCCI), Low Temperature Combustion (LTC), or Hydraulic Activated Diesel Injectors (HADI) engines, which operate by reducing the combustion flame temperature within the engine cylinder and by increasing the uniformity and mixing of the fuel charge prior to ignition. Numerous variants of advanced combustion technologies are known in the art, and the above list is not meant to be inclusive of all variants. Advanced combustion diesel engine exhaust is characterized by and distinguished from traditional diesel engine exhaust as having higher emissions of HC and CO (in some instances 50% to 100% higher) and lower emissions of $NO_x$ (in some instances two to three times lower) than traditional diesel engines. More specifically, emissions from advanced combustion vehicles is typically characterized as having <0.18 g/km Nox, >2.5 g/km CO, and >0.5 g/km HC in the New Emissions Drive Cycle (NEDC). Particulate matter can also be significantly reduced in advanced combustion engines. Although the emissions from a lean burn advanced combustion diesel engine may become more like the emissions from a spark-ignited stoichiometric gasoline engine, the mode of engine operation is completely different and the therefore the exhaust treatment strategy is also completely different. As will be appreciated by the skilled artisan, the exhaust gas characteristics and mode of engine operation of advanced combustion diesel engines being different than traditional diesel engines and gasoline spark-ignited engines will require different treatment strategies and/or catalyst compositions for the effective treatment of HC, CO and $NO_x$ than has been previously used for diesel and spark ignited engines.

Details of the components of a gas treatment article and system according to embodiments of the invention are provided below.

The Carrier

According to one or more embodiments, the carrier may be any of those materials typically used for preparing DOC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic carrier may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α-alumina, aluminosilicates and the like.

The carriers useful for the layered catalyst composites of the present invention may also be metallic in nature and may be composed of one or more metals or metal alloys. The metallic carriers may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

Preparation of Catalyst Composites

The catalyst composites of the present invention may be formed in a single layer or multiple layers. In some instances, it may be suitable to prepare one slurry of catalytic material and use this slurry to form multiple layers on the carrier. The composites can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage therethrough of the gas stream being treated.

The catalyst composite can be readily prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 $g/in^3$ per dip. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 400-600° C. for about 10 minutes to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or tetraammine palladium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds or stabilizers, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt %, more particularly about 30-40 wt %.

Additional layers, i.e., second and third layers may be prepared and deposited upon the first layer in the same manner as described above for deposition of the first layer upon the carrier.

Providing coated, multi-zoned catalyst substrates can be done by methods know in the art, for example, as described in U.S. Pat. No. 7,189,376, incorporated herein by reference.

As noted above, palladium (Pd) recently has become of greater interest for use in DOCs due to its relatively lower cost. However, cost is not the only factor to consider in the design of an automotive catalyst composition. Regardless of cost, if a particular catalyst material is susceptible to poisoning or degradation in a particular engine exhaust environment, that particular material will not be utilized in a catalyst composition if the catalyst composition will be poisoned or degraded over time. In embodiments related to advanced combustion engines, Pd may also have several performance advantages over Pt. For example, Pt is susceptible to inhibition (i.e. poisoning) by CO at high concentrations, and Pt has very poor performance for oxidation of methane. Pd, on the other hand, is not self-inhibited by CO and is known to be more effective than Pt for paraffin and methane oxidation. Since increased CO and methane emissions are expected from advanced combustion diesel engines, use of Pd may have a significant benefit. In addition, although Ce-containing supports have found wide use in TWC applications, they are generally avoided in diesel applications due to their negative impact on Pt performance in lean exhaust. This invention proposes the use of Pd in combination with Ce-containing precious metal supports to destroy the high levels of CO and HC (particularly methane) associated with advanced combustion engines.

Because of unstable combustion characteristics under cold-start conditions, advanced combustion engines likely will be started in a conventional mode which generates lower CO and HC emissions. As quickly as possible (e.g. 1-2 minutes), the engine will be brought into the "advanced combustion mode" to lower engine out NOx and PM emissions. The catalyst must remain active under both operation modes and therefore be able to handle large extremes in the CO and HC emissions. Although conventional Pt or Pt/Pd based catalysts show good CO and HC performance under conventional diesel operating conditions, their light-off temperature significantly increases with higher engine-out CO and HC levels. Furthermore, once the catalyst is activated and operating in the "advanced combustion mode", it must be able to effectively oxidize these components even as the overall engine-out temperature drops.

Figure 2:
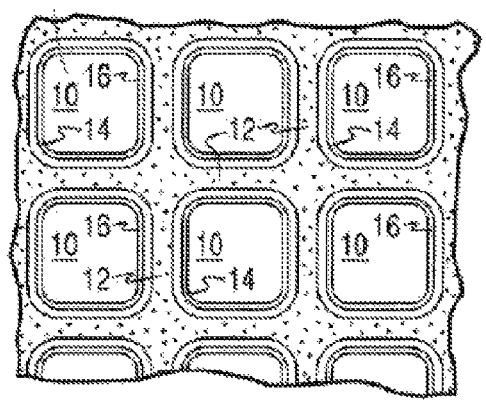
FIG. 2 is a partial cross-sectional view enlarged relative to FIG. 1 and taken along a plane parallel to the end faces of the carrier of FIG. 1, which shows an enlarged view of the gas flow passages shown in FIG. 1.

The catalyst composite according to one or more embodiments of the present invention may be more readily appreciated by reference to FIGS. 1 and 2. FIGS. 1 and 2 show a refractory carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A first washcoat layer 14, which in the art and sometimes below is referred to as a "washcoat", is adhered or coated onto the walls 12 of the carrier member. As shown in FIG. 2, a second washcoat layer 16 is coated over the first washcoat layer 14 as described above. In one embodiment, an undercoat (not shown) can be applied to the substrate beneath the first washcoat layer 16.

As shown in FIG. 2, the carrier member include void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("$g/in^3$") and grams per cubic foot ("$g/ft^3$") are used herein to mean the weight of a component per volume of the carrier member, including the volume of void spaces of the carrier member.

In another embodiment, the washcoat layers of the present invention may be zone coated such that first washcoat layer is on the upstream end, and the second washcoat layer on the downstream end of the carrier substrate. For example, an upstream washcoat layer can be coated over a portion of the upstream region of the substrate and a downstream washcoat layer can be coated over a downstream portion of the substrate. In such embodiments, the second or downstream washcoat layer of the present invention can be at least partially coated over the first or upstream washcoat layer.

Figure 3A:
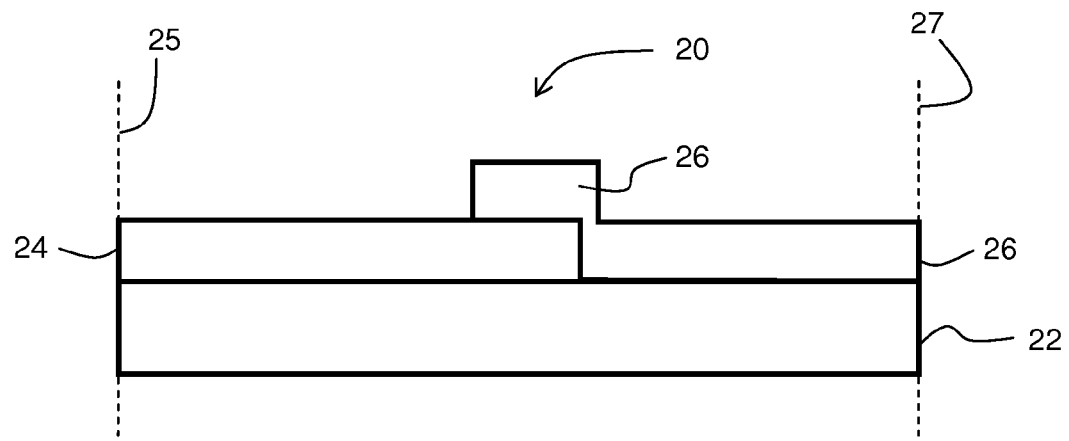
FIGS. 3A through 3E show a cross-sectional view of oxidation catalyst composites according to various embodiments of the invention.

The catalyst composite embodiment including upstream and downstream zones may be more easily understood by reference to FIGS. 3A through 3E. FIG. 3A shows an embodiment of a zoned oxidation catalyst composite 20 for abatement of exhaust gas emissions from an engine. A carrier substrate 22, for example, a honeycomb monolith, having an inlet or upstream end 25, and outlet or downstream end 27 and an axial length extending between the inlet end 25 and outlet end, contains two separate zone coated washcoat layers. A first washcoat layer 24 and a second washcoat layer 26 are applied to the substrate 22. The first washcoat layer 24 extends from the inlet or upstream end 25 and contains a first refractory metal oxide support including cerium and a palladium (Pd) component, the first washcoat layer being substantially free of a molecular sieve. A second washcoat layer 26 extends from the outlet or downstream end 27 and comprises a second refractory oxide support, a platinum component and a molecular sieve, the second washcoat layer being substantially free of palladium. In a detailed embodiment, the platinum and palladium are present in a 2:1 ratio. In another embodiment, the composition of the first and second washcoat layers can be reversed.

The length of the upstream washcoat layer 24 can also be described as a percentage of the length of the catalytic member from the upstream to downstream edge. Typically, the upstream washcoat layer 24 will comprise from about 5% to about 95% of the overall length substrate support. With the downstream washcoat portion 26 covering the remaining downstream portion of the substrate 22. Thus, the downstream washcoat portion 26 may comprise 95% to about 5% of axial length substrate 22. In the embodiment shown in FIG. 3A, the second washcoat layer 26 at least partially overlaps the first washcoat layer 24.

Figure 3B:
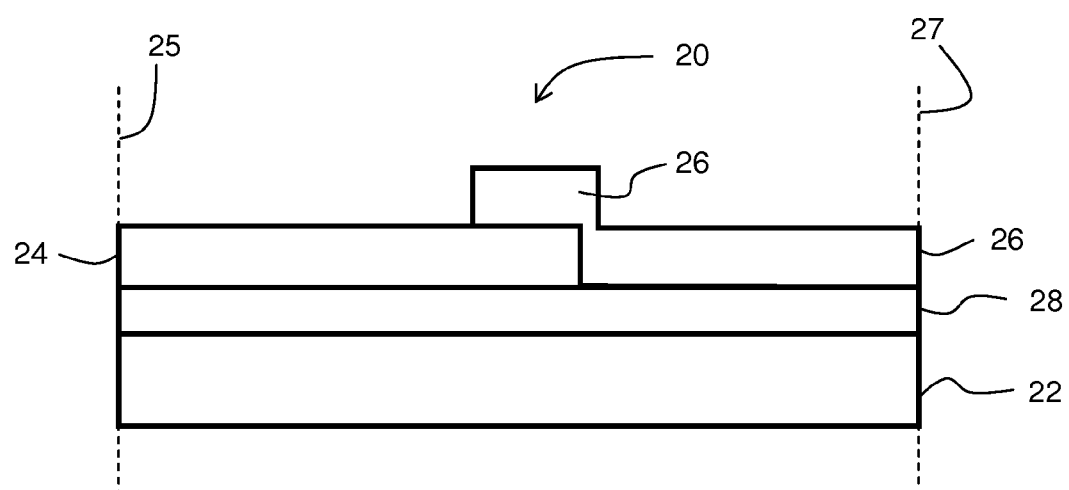

According to other embodiments, as shown in FIG. 3B, an undercoat layer 28 may be applied to the substrate prior to the first washcoat layer 24. In a specific embodiment, the undercoat has no precious metal component intentionally added to the undercoat composition. For example, the undercoat may comprise a refractory oxide support. Through diffusion or migration, some palladium from the first washcoat layer may be present in the undercoat layer 28. The compositions of the first washcoat layer 24 and second washcoat layer can be as described above with respect to FIG. 3A.

Figure 3C:
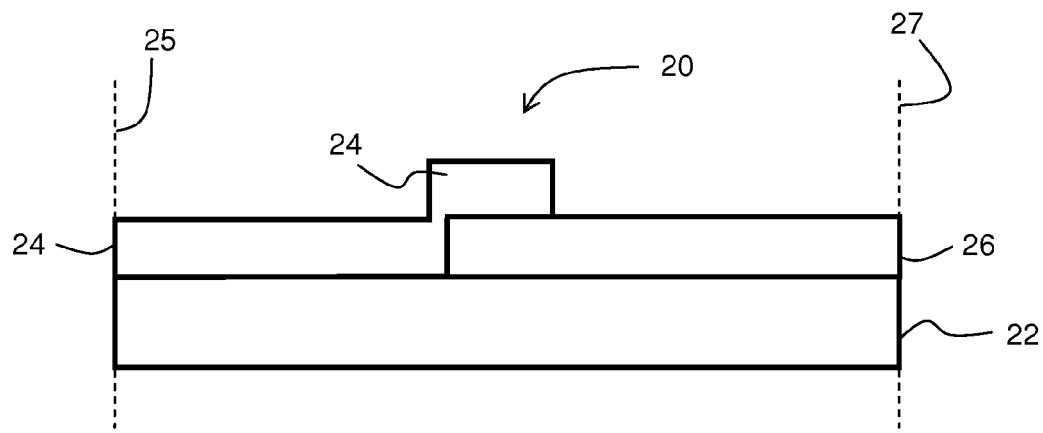

Referring now to FIG. 3C, an alternative coating strategy is shown. In this embodiment, the first washcoat layer 24 extends from the inlet end toward the outlet end. A second washcoat layer 26 is located adjacent and downstream from the first washcoat layer. The first washcoat layer 24 can at least partially overlap the second washcoat layer. In one embodiment, the first washcoat layer 24 contains a first refractory metal oxide support including cerium and a palladium (Pd) component, the first washcoat layer being substantially free of a molecular sieve. The second washcoat layer comprises a second refractory oxide support, a platinum component and a molecular sieve, the second washcoat layer being substantially free of palladium. In a detailed embodiment, the platinum and palladium are present in a 2:1 ratio. In another embodiment, the composition of the first and second washcoat layers can be reversed. The first washcoat layer can extend from the inlet end 25 to about 5% and up to about 95% of the axial length of the substrate. The second washcoat layer 26 extends from the outlet end 27, and the outlet layer can extend from about 5% to about 95% of the axial length of the substrate.

Figure 3D:
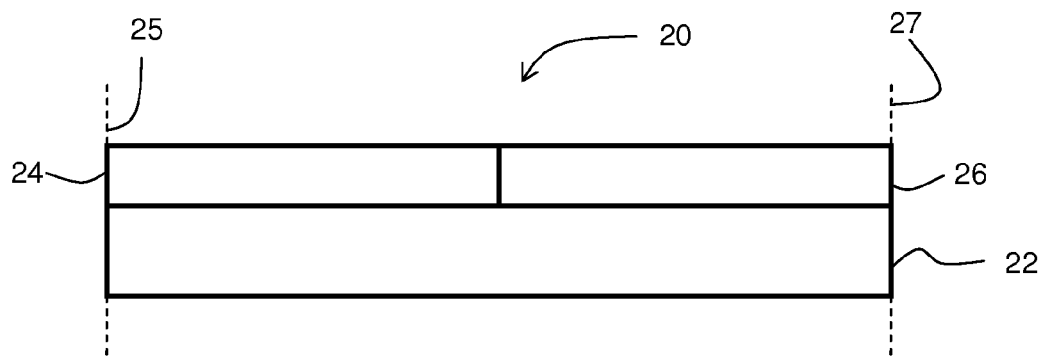

FIG. 3D shows an embodiment in which the first washcoat layer 24 and second washcoat layer 26 are located side-by-side along the length of the carrier substrate 22. The first washcoat layer 24 of specific embodiments extends from the inlet end 25 of the substrate 22 through the range of about 5% and about 95% of the length of the substrate 22. In specific embodiments the first washcoat layer extends along the length of the substrate in the range of about 40% and 60%, for example, 40%, 45%, 50%, 55% or 60% of the length of the substrate. The second washcoat layer 26 extends from the outlet end 27 of the substrate 22 for about 5% to about 95% of the axial length of the substrate. The composition of the first and second washcoat layers can be as described above with respect to FIGS. 3A to 3C.

Figure 3E:
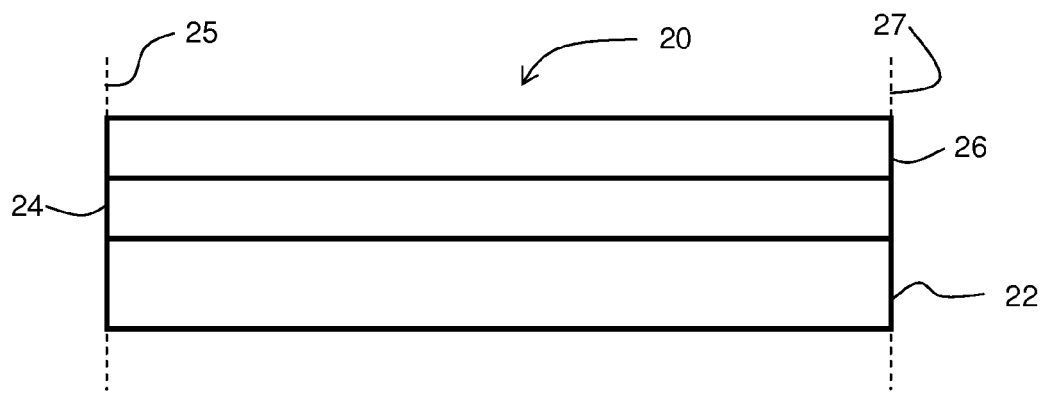

FIG. 3E shows an embodiment in which the first washcoat layer 24 covers the entire axial length of the substrate 22, and the second washcoat layer 26 covers the first washcoat layer 24. The composition of the first and second washcoat layers can be as described above with respect to FIGS. 3A to 3C.

Suitable loadings for the components in the first and second washcoat layers are as follows.

The Pd component in the first washcoat layer may be present in the range of about 10 $g/ft^3$ to about 140 $g/ft^3$ (including 20, 30, 40 50, 60, 70, 80, 90, 100, 110, 120, and 130 $g/ft^3$). The Pt component may be present in an amount in the range of about 20 $g/ft^3$ to about 140 $g/ft^3$ (including 30, 40, 50, 60, 70, 80, 90, 100, 110, 120, 130 $g/ft^3$). The cerium-containing support can be present in the range of about 0.1 to about 4 $g/in^3$, with a more specific range of about 0.5 to 2 $g/in^3$.

The refractory oxide support, for example, alumina may be present in the range of about 0.1 to about 3 $g/in^3$, with a more specific range of about 0.5 $g/in^3$ to about 2 $g/in^3$. A molecular sieve, for example H-beta zeolite may be present in the range of about 0.1 to about 1 $g/in^3$, with a more specific range of about 0.2 to about 0.5 $g/in^3$.

The diesel oxidation catalyst (DOC) composite of the present invention can be used in an integrated emission treatment system comprising one or more additional components for the treatment of diesel exhaust gas emissions. For example, the emission treatment system may further comprise a catalyzed soot filter (CSF) component and/or a selective catalytic reduction (SCR) catalytic article. The diesel oxidation catalyst can be located upstream or downstream from the soot filter and/or selective catalytic reduction component.

In addition to treating the exhaust gas emissions via use of an oxidation catalyst the present invention may employ a soot filter for removal of particulate matter. The soot filter may be located upstream or downstream from the DOC, but typically, the soot filter will be located downstream from the diesel oxidation catalyst. In one embodiment, the soot filter is a catalyzed soot filter (CSF). The CSF may comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Other wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite and silicon carbide. Such materials are able to withstand the environment, particularly high temperatures, encountered in treating the exhaust streams.

The exhaust gas treatment system of the present invention may further comprise a selective catalytic reduction (SCR) component. The SCR component may be located upstream or downstream of the DOC and/or soot filter. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations. The system may further include a NOx storage and release (NSR) catalytic article. In certain embodiments, one or the other of an SCR or NSR catalytic article is included in the system.

Figure 4:
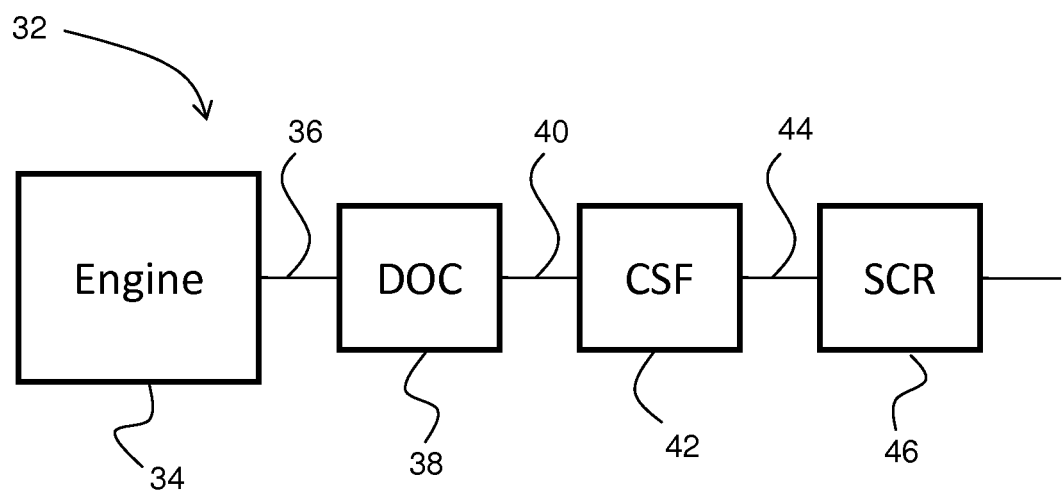
FIG. 4 is a schematic of an engine emission treatment system, in accordance with one embodiment of the present invention.

In one embodiment, the present invention is directed to an emission treatment system comprising one or more additional components for the treatment of diesel exhaust gas emissions. An exemplified emission treatment system may be more readily appreciated by reference to FIG. 4, which depicts a schematic representation of an emission treatment system 32, in accordance with this embodiment of the present invention. Referring to FIG. 4, an exhaust gas stream containing gaseous pollutants (e.g., unburned hydrocarbons, carbon monoxide and NOx) and particulate matter is conveyed via line 36 from an engine 34 to a diesel oxidation catalyst (DOC) 38, which is coated with the novel washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the NOx component may be oxidized to $NO_2$ in the DOC. The exhaust stream is next conveyed via line 40 to a catalyzed soot filter (CSF) 42, which traps particulate matter present within the exhaust gas stream. The CSF 42 is optionally catalyzed for passive regeneration. After removal of particulate matter, via CSF 42, the exhaust gas stream is conveyed via line 44 to a downstream selective catalytic reduction (SCR) component 16 for the treatment and/or conversion of NOx. The DOC 38 may be placed in a close-coupled position.

One or more embodiments of the invention are directed to methods for treating a diesel exhaust gas stream comprising CO, HC and $NO_x$. The exhaust gas stream is contacted with a first washcoat layer comprising a first refractory metal oxide support including cerium and a palladium (Pd) component, the first washcoat layer being substantially free of a molecular sieve and platinum. Thereafter, the exhaust gas contacts the second washcoat layer comprising a second refractory oxide support, a platinum component and a molecular sieve, the second washcoat layer being substantially free of palladium.

In other embodiments, the diesel exhaust gas stream subsequent to contacting the second washcoat layer is directed to a catalyzed soot filter (CSF) located downstream of the diesel oxidation catalyst. In further embodiments, the diesel exhaust gas stream subsequent to contacting the catalyzed soot filter (CSF) is directed to a selective catalytic reduction (SCR) component located downstream of the catalyzed soot filter (CSF).

The DOC catalyst compositions disclosed herein may be useful as stable close-coupled catalysts. Close-coupled catalysts are placed close to an engine to enable them to reach reaction temperatures as soon as possible. In specific embodiments, the close-coupled catalyst is placed within three feet, more specifically, within one foot of the engine, and even more specifically, less than six inches from the engine. Close-coupled catalysts are often attached directly to the exhaust gas manifold. Due to their close proximity to the engine, close-coupled catalysts are preferably stable at high temperatures.

Specific embodiments according to the present invention will now be described in the following examples. The examples are illustrative only, and are not intended to limit the remainder of the disclosure in any way. Although the instant specification places emphasis on oxidation in a diesel engine, the oxidation catalysts described herein are useful for other catalytic reactions, such as oxidation of CO and hydrocarbons in gasoline engines.

Before describing several exemplary embodiments of the invention, it is to be understood that the invention is not limited to the details of construction or process steps set forth in the following description. The invention is capable of other embodiments and of being practiced in various ways. In the following, preferred designs for the layered catalyst composites are provided, including such combinations as recited used alone or in unlimited combinations, the uses for which include systems and methods of other aspects of the present invention.

EXAMPLES

Example 1

Layered Catalyst Composite

A washcoated Pt/Pd catalyst composition was prepared with two layers by coating Pt- and Pd-containing aqueous slurries onto a 1.5" diameter by 2" long cordierite honeycomb monolith substrate (400 cpsi with 4 mil wall thickness). The bottom layer comprised Pd on OSC and the top layer comprised Pt on alumina. The total precious metal loading was 110 g/ft$^3$, and the Pt/Pd ratio was 2:1. The two layers were prepared as follows:
Bottom Layer An OSC material comprising 18% ceria, 10% yttria, 5% neodymia, 5% lanthana, and 62% zirconia and having a BET surface area of approximately 80 m$^2$/g was impregnated with a water soluble Pd salt using standard incipient wetness techniques. The resulting powder was dried and then calcined at 450° C. for 1 h. The calcined powder was placed into DI water, and the pH of the resulting aqueous slurry was reduced to 4.6 by addition of an inorganic acid. After reducing the particle size to 90% less than 5 um by milling using methods known in the art, the slurry was coated onto a cordierite substrate using deposition methods also known in the art.

The coated monolith was then calcined at 450° C. for 1 h. The total washcoat loading after calcination was approximately 2.0 g/in$^3$.
Top Layer A high surface area gamma alumina having a BET surface area of approximately 150 m$^2$/g, a pore volume of approximately 0.85 cc/g, and an average pore size of approximately 100 Å was impregnated with a water soluble Pt salt using standard incipient wetness techniques. The powder was further impregnated with an organic acid. The resulting powder was subsequently placed into DI water, and the pH of the resulting aqueous slurry was reduced to 4.6 by addition of an inorganic acid. Subsequently, dry H-Beta zeolite powder was added to the slurry. After reducing the particle size to 90% less than 11 um by milling using methods known in the art, the slurry was coated over the bottom coat on the cordierite substrate using deposition methods also known in the art. The coated monolith was then calcined at 450° C. for 1 h. Total washcoat loading for the top coat after calcination was approximately 1.3 g/in$^3$ with beta zeolite comprising 0.3 g/in$^3$.

Example 2

Reverse Layered Catalyst Composite

A washcoated Pt/Pd catalyst composition was prepared with two layers by coating Pt- and Pd-containing aqueous slurries onto a 1.5" diameter by 2" long cordierite honeycomb monolith substrate (400 cpsi with 4 mil wall thickness). The bottom layer comprised Pt on alumina and the top layer comprised Pd on OSC. The total precious metal loading was 110 g/ft$^3$, and the Pt/Pd ratio was 2:1. The slurries for the two layers were prepared according to the procedure of Example #1, but the layers were applied in the opposite order as Example #1. Total washcoat loading after calcination was approximately 1.3 g/in$^3$ for the bottom layer (with beta-zeolite comprising 0.3 g/in$^3$) and 2.0 g/in$^3$ for the top layer.

Example 3

Zoned Catalyst Composite

A washcoated Pt/Pd catalyst composition was prepared with two zones by coating Pt- and Pd-containing aqueous slurries axially onto a 1.5" diameter by 2" long cordierite honeycomb monolith substrate (400 cpsi with 4 mil wall thickness). The front zone (front 50% of monolith length) comprised Pd on OSC and the rear zone (rear 50% of monolith length) comprised Pt on alumina. The total precious metal loading was 110 g/ft$^3$, and the Pt/Pd ratio was 2:1. The two zones were prepared as follows:
Front (Upstream) Zone An OSC material comprising 18% ceria, 10% yttria, 5% neodymia, 5% lanthana, and 62% zirconia and having a BET surface area of approximately 80 m2/g was impregnated with a water soluble Pd salt using standard incipient wetness techniques. The resulting powder was dried and then calcined at 450° C. for 1 h. The calcined powder was placed into DI water, and the pH of the resulting aqueous slurry was reduced to 4.6 by addition of an inorganic acid. After reducing the particle size to 90% less than 6 um by milling using methods known in the art, the slurry was coated onto the front ½ length of a cordierite substrate using deposition methods also known in the art. The coated monolith was dried and then calcined at 450° C. for 1 h. A second layer was similarly applied over the first layer (again, only the front ½ of the substrate length), and the twice-coated monolith was dried and calcined again at 450° C. for 1 h. The total washcoat loading for the inlet zone after the second calcination was approximately 3.2 g/in3.
Rear (Downstream) Zone A high surface area gamma alumina having a BET surface area of approximately 150 m$^2$/g, a pore volume of approximately 0.85 cc/g, and an average pore size of approximately 100 Å was impregnated with a water soluble Pt salt using standard incipient wetness techniques. The powder was further impregnated with an organic acid. The resulting powder was subsequently placed into DI water, and the pH of the resulting aqueous slurry was reduced to 4.5 by addition of an inorganic acid. Subsequently, dry H-Beta zeolite powder was added to the slurry. After reducing the particle size to 90% less than 13 um by milling using methods known in the art, the slurry was coated onto the rear ½ length of a cordierite substrate using deposition methods also known in the art. The coated monolith was dried and then calcined at 450° C. for 1 h. The total washcoat loading for the outlet zone after calcination was approximately 1.3 g/in$^3$ with H-Beta zeolite comprising 0.3 g/in$^3$.

A second rear zone slurry was similarly prepared using a high surface area silica doped gamma alumina comprising 5% silica and having a BET surface area of approximately 115 m$^2$/g and a pore volume of approximately 0.70 cc/g. The slurry was coated as a second layer onto the rear ½ length of a cordierite substrate using deposition methods known in the art. The coated monolith was dried and then calcined at 450° C. for 1 h. The total washcoat loading for the second layer of the outlet zone after calcination was approximately 1.3 g/in$^3$ with H-Beta zeolite comprising 0.3 g/in$^3$.

Example 4

Reverse Zoned Catalyst Composite

A washcoated Pt/Pd catalyst composition was prepared with two zones by coating Pt- and Pd-containing aqueous slurries axially onto a 1.5" diameter by 2" long cordierite honeycomb monolith substrate (400 cpsi with 4 mil wall thickness). The front zone (front 50% of monolith length) comprised Pt on alumina and the rear zone (rear 50% of monolith length) comprised Pd on OSC. The total precious metal loading was 110 g/ft3, and the Pt/Pd ratio was 2:1. The slurries for the two zones were prepared according to the procedure of Example #3, but the zones were applied in the opposite orientation as in Example #3. Total washcoat loading after calcination for the two layers of the inlet (Pt/alumina) zone was approximately 2.6 g/in3 (with beta-zeolite comprising 0.6 g/in3). Total washcoat loading after calcination for the two layers of the outlet (Pd/OSC) zone was approximately 3.2 g/in3.

Example 5

Overlapping Zoned Catalyst Composite

A washcoated Pt/Pd catalyst composition was prepared with two overlapping zones by coating Pt- and Pd-containing aqueous slurries axially onto a 1.5" diameter by 2" long cordierite honeycomb monolith substrate (400 cpsi with 4 mil wall thickness). The front zone (front 70% of monolith length) comprised Pd on OSC and the rear zone (rear 70% of monolith length) comprised Pt on alumina. The middle 40% of the substrate subsequently comprised overlapped zones with a Pd/OSC bottom layer and a Pt/alumina top layer. The total precious metal loading was 97 g/ft3, and the Pt/Pd ratio was 2:1. The two zones were prepared as follows:

Front (Upstream) Zone

An OSC material comprising 18% ceria, 10% yttria, 5% neodymia, 5% lanthana, and 62% zirconia and having a BET surface area of approximately 80 m2/g was impregnated with a water soluble Pd salt using standard incipient wetness techniques. The resulting powder was dried and then calcined at 450° C. for 1 h. The calcined powder was placed into DI water, and the pH of the resulting aqueous slurry was reduced to 4.4 by addition of an inorganic acid. After reducing the particle size to 90% less than 8 um by milling using methods known in the art, the slurry was coated onto the front 70% length of a cordierite substrate using deposition methods also known in the art. The coated monolith was dried and then calcined at 550° C. for 1 h. The total washcoat loading for the inlet zone after the second calcination was approximately 2.0 g/in3.

Rear (Downstream Zone) Zone

A high surface area gamma alumina having a BET surface area of approximately 150 m2/g, a pore volume of approximately 0.85 cc/g, and an average pore size of approximately 100 Å was impregnated with a water soluble Pt salt using standard incipient wetness techniques. The powder was further impregnated with an organic acid. The resulting powder was subsequently placed into DI water, and the pH of the resulting aqueous slurry was reduced to 4.5 by addition of an inorganic acid. After reducing the particle size to 90% less than 11 um by milling using methods known in the art, a second slurry comprising SAL-Beta (sulfuric acid leached beta) zeolite and similarly pre-milled to a particle size 90% less than 30 um was added. The resulting composite slurry was coated onto the rear 70% length of a cordierite substrate using deposition methods also known in the art. The coated monolith was dried and then calcined at 550° C. for 1 h. The total washcoat loading for the outlet zone after calcination was approximately 1.4 g/in3 with SAL-Beta zeolite comprising 0.3 g/in3.

Example 6

Reversed (Overlapping Zoned Catalyst Composite)

A washcoated Pt/Pd catalyst composition was prepared with two overlapping zones by coating Pt- and Pd-containing aqueous slurries axially onto a 1.5" diameter by 2" long cordierite honeycomb monolith substrate (400 cpsi with 4 mil wall thickness). The front zone (front 70% of monolith length) comprised Pd on OSC and the rear zone (rear 70% of monolith length) comprised Pt on alumina. The middle 40% of the substrate subsequently comprised overlapped zones with a Pt/alumina bottom layer and a Pd/OSC top layer. The total precious metal loading was 97 g/ft3, and the Pt/Pd ratio was 2:1. The slurries for the two zones were prepared according to the procedure of Example #5, but the zones were coated in the opposite order resulting in an opposite overlap orientation as in Example #5. Total washcoat loading after calcination for the inlet (Pt/alumina) zone was approximately 1.4 g/in3 (with SAL-beta zeolite comprising 0.3 g/in3). Total washcoat loading after calcination for the outlet (Pd/OSC) zone was approximately 2.0 g/in3.

Example 7

Uniform Coated Catalyst Composite Without Zeolite

A washcoated Pt/Pd catalyst composition was prepared with a uniform mixture of Pd on OSC and Pt on alumina by coating a Pt- and Pd-containing aqueous slurry onto a 1.5" diameter by 2" long cordierite honeycomb monolith substrate (400 cpsi with 4 mil wall thickness). The total precious metal loading was 110 g/ft3, and the Pt/Pd ratio was 2:1. The Pt- and Pd-containing aqueous slurry was prepared as follows:

An OSC material comprising 20% ceria, 6% neodymia, 6% lanthana, and 68% zirconia and having a BET surface area of approximately 100 m2/g was impregnated with a water soluble Pd salt using standard incipient wetness techniques. Separately, a high surface area gamma alumina having a BET surface area of approximately 150 m2/g, a pore volume of approximately 0.4 cc/g, and an average pore size of approximately 50 Å was impregnated with a water soluble Pt salt using standard incipient wetness techniques. This powder was further impregnated with an organic acid. The resulting Pd/OSC and Pt/alumina impregnated powders were placed into DI water, and the pH of the resulting aqueous slurry was reduced to 3.7 by addition of an organic acid. After reducing the particle size to 90% less than 9 um by milling using methods known in the art, the slurry was coated onto a cordierite substrate using deposition methods also known in the art. The coated monolith was dried and then calcined at 550° C. for 1 h. The total washcoat loading after calcination was approximately 1.6 g/in3 with OSC material comprising approximately 1.0 g/in3 and alumina comprising 0.5 g/in3. A second layer was similarly applied over the first layer, and the twice-coated monolith was dried and calcined again at 550° C. for 1 h. The total washcoat loading for second layer after calcination was approximately 1.6 g/in3 with OSC material comprising approximately 1.0 g/in3 and alumina comprising 0.5 g/in3

Comparative Example 8

Uniform Coated Catalyst Composite With Zeolite

A washcoated Pt/Pd catalyst composition was prepared with a uniform mixture of Pd on OSC, Pt on alumina, and beta zeolite by coating a Pt- and Pd-containing aqueous slurry onto a 1.5" diameter by 2" long cordierite honeycomb monolith substrate (400 cpsi with 4 mil wall thickness). The total precious metal loading was 110 g/ft3, and the Pt/Pd ratio was 2:1. The Pt- and Pd-containing aqueous slurry was prepared as follows:

An OSC material comprising 20% ceria, 6% neodymia, 6% lanthana, and 68% zirconia and having a BET surface area of approximately 100 m2/g was impregnated with a water soluble Pd salt using standard incipient wetness techniques. Separately, a high surface area gamma alumina having a BET surface area of approximately 150 m2/g, a pore volume of approximately 0.4 cc/g, and an average pore size of approximately 50 Å was impregnated with a water soluble Pt salt using standard incipient wetness techniques. This powder was further impregnated with an organic acid. The resulting Pd/OSC and Pt/alumina impregnated powders were placed into DI water, and the pH of the resulting aqueous slurry was reduced to 3.7 by addition of an organic acid. Subsequently, H-Beta zeolite powder was added to the slurry. After reducing the particle size to 90% less than 9 um by milling using methods known in the art, the slurry was coated onto a cordierite substrate using deposition methods also known in the art. The coated monolith was dried and then calcined at 550° C. for 1 h. The total washcoat loading after calcination was approximately 1.6 g/in3 with OSC material comprising approximately 0.75 g/in3, alumina comprising 0.25 g/in3, and beta zeolite comprising 0.25 g/in3. A second layer was similarly applied over the first layer, and the twice-coated monolith was dried and calcined again at 550° C. for 1 h. The total washcoat loading for second layer after calcination was approximately 1.6 g/in3 with OSC material comprising approximately 0.75 g/in3, alumina comprising 0.25 g/in3, and beta zeolite comprising 0.25 g/in3.

Comparative Example 9

Uniform Coated Catalyst Composite With Zeolite but Without OSC

A washcoated Pt/Pd catalyst composition was prepared with a uniform mixture of Pt and Pd on alumina and beta zeolite by coating a Pt- and Pd-containing aqueous slurry onto a 1.5" diameter by 2" long cordierite honeycomb monolith substrate (400 cpsi with 4 mil wall thickness). The total precious metal loading was 110 g/ft3, and the Pt/Pd ratio was 2:1. The Pt- and Pd-containing aqueous slurry was prepared as follows:

A high surface area silica doped alumina comprising 1.5% silica and having a BET surface area of approximately 110 m2/g, a pore volume of approximately 0.35 cc/g, and an average pore size of approximately 50 Å was impregnated with a water soluble Pt salt to 70% incipient wetness using standard incipient wetness techniques. This powder was further impregnated to 100% incipient wetness with a water soluble Pd salt. The Pt and Pd impregnated powder was subsequently placed into DI water, and the pH of the resulting aqueous slurry was reduced to 4 by addition of an organic acid. After reducing the particle size to 90% less than 10 um by milling using methods known in the art, H-Beta zeolite powder was added to the slurry. After further reducing the particle size to 90% less than 8 um by milling using methods known in the art, the slurry was coated onto a cordierite substrate using deposition methods also known in the art. The coated monolith was dried and then calcined at 550° C. for 1 h. The total washcoat loading after calcination was approximately 1.6 g/in3 with beta zeolite comprising approximately 0.1 g/in3. A second layer was similarly applied over the first layer, and the twice-coated monolith was dried and calcined again at 550° C. for 1 h. The total washcoat loading for the second layer after calcination was approximately 1.6 g/in3 with beta zeolite comprising approximately 0.1 g/in3.

Comparative Example 10

Layered Catalyst Composite Without OSC and With Zeolite Separate from Pd

A washcoated Pt/Pd catalyst composition was prepared with two layers by coating Pt- and Pd-containing aqueous slurries onto a 1.5" diameter by 2" long cordierite honeycomb monolith substrate (400 cpsi with 4 mil wall thickness). The bottom layer comprised Pt and Pd on alumina and the top layer comprised Pt on SAL-Beta zeolite. The total precious metal loading was 120 g/ft3, and the Pt/Pd ratio was 2:1. The Pt loading of the top layer was 8 g/ft3. The two layers were prepared as follows:
Bottom Layer A high surface area gamma alumina having a BET surface area of approximately 150 m2/g, a pore volume of approximately 0.85 cc/g, and an average pore size of approximately 100 Å was placed into DI water and the pH of the resulting aqueous slurry was reduced to 4.3 by addition of an inorganic acid. After reducing the particle size to 90% less than 21 um by milling using methods known in the art, a solution of water soluble Pt salt and a solution of water soluble Pd salt were sequentially added to the slurry with mixing. Alumina sol binder was also added at an equivalent dry loading of 4% to the alumina support. The slurry was subsequently coated onto the cordierite substrate using deposition methods known in the art, and the coated monolith was then calcined at 550° C. for 1 h. Total washcoat loading after calcination was approximately 1.2 g/in3.
Top Layer Sulfuric acid leached (SAL) Beta zeolite was placed into DI water, and the particle size of the resulting slurry was reduced to 90% less than 23 um by milling using methods known in the art. A solution of water soluble Pt salt was then added to the slurry with mixing. Alumina sol binder was also added at an equivalent dry loading of 10% to the zeolite support. The slurry was subsequently coated onto the bottom layer of the previously coated cordierite substrate using deposition methods known in the art, and the coated monolith was then calcined at 550° C. for 1 h. Total washcoat loading after calcination was approximately 0.45 g/in3.

Example 11

Lab Reactor CO Light-Off Testing

The coated Pt/Pd catalyst monolith compositions prepared in Examples 1 through 10 were tested as follows. First, the coated monoliths were aged in a laboratory reactor at approximately 750° C. for 5 hours in flowing air comprising 10% steam. After aging, the coated monoliths were evaluated for light-off of carbon monoxide (CO) using a laboratory reactor system. The light-off testing protocol included two distinct gas compositions differing in the total amount of CO and hydrocarbons. The first composition simulating standard diesel engine exhaust comprised 1500-1700 ppm CO, 500 ppm total hydrocarbon on a C1 basis (20% methane, 30% propylene, 36% decane, and 14% toluene), 10% O2, 50 ppm NO, 3.5-4.0% CO2, and 5% H2O. The second composition simulating advanced combustion diesel engine exhaust comprised 5000 ppm CO, 2000 ppm total hydrocarbon on a C1 basis (20% methane, 30% propylene, 36% decane, and 14% toluene), 10% O2, 50 ppm NO, 3.5-4.0% CO2, and 5% H2O. The test samples were equilibrated for 5 minutes under the flowing gas at 100° C. prior to ramping to 500° C. at a ramp rate of 20° C./min. The total gas flow space velocity was 55,000 h−1. HC/CO conversions were measured while the temperature was raised. CO concentration was measured using a CO analyzer or optionally a Fourier Transform Infrared (FTIR) analyzer. Total hydrocarbons (THC) were measured using an FID or optionally a Fourier Transform Infrared (FTIR) analyzer. The temperatures at which 50% conversion of CO occurred using the two different reactant feed gas compositions is reported in Table 1.

TABLE 1

| Formulation | PGM Loading (g/ft$^3$) | Pt/Pd Ratio | CO LO Temperature (° C.) after 800° C. Steam Aging (5 h, 10% steam) | |
|---|---|---|---|---|
| | | | 1500-1700 ppm CO & 500 ppm HC | 5000 ppm CO & 2000 ppm HC |
| Example #1 (layered) | 110 | 2:1 | 132 | 160 |
| Example #2 (reverse layered) | 110 | 2:1 | 138 | 162 |
| Example #3 (zoned) | 110 | 2:1 | 131 | 137 |
| Example #4 (reverse zoned) | 110 | 2:1 | 138 | 157 |
| Example #5 (zoned w. overlap) | 97 | 2:1 | 143 | 162 |
| Example #6 (reversed overlapping zones) | 97 | 2:1 | 149 | 176 |
| Example #7 (uniform Pd/OSC & Pt/alumina without zeolite) | 110 | 2:1 | 167 | 184 |
| Example #8 (uniform with zeolite) | 110 | 2:1 | 177 | 203 |
| Example #9 (uniform with zeolite but without OSC) | 110 | 2:1 | 173 | 195 |
| Example #10 (layered with zeolite but without OSC) | 120 | 2:1 | 174 | 203 |

The light-off test results clearly demonstrate the benefit of catalyst compositions in Examples 1-7 comprising Pd and OSC which is additionally separated from zeolite.

Example 12

Low NOx Euro 6 Concept Engine Testing

Samples were tested on a low NOx Euro 6 concept engine with a CO engine out of about 4 g/km and a hydrocarbon engine out of about 0.8 g/km. The catalyst of Example 5 was compared to a Reference catalyst having the same composition as that of Example 10, but with the platinum and palladium impregnated onto the support. The catalyst of Example 5 showed CO and hydrocarbon conversion of about 85%, whereas the Reference sample exhibited conversion of about 78% for both CO and hydrocarbons.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An oxidation catalyst composite for abatement of exhaust gas emissions from an engine comprising:
   a carrier substrate having a length, an inlet end and an outlet end, a diesel oxidation catalyst catalytic material on the carrier, the diesel oxidation catalyst catalytic material including a first washcoat layer and a second washcoat layer,
   the first washcoat layer comprising a palladium (Pd) component supported by a first refractory metal oxide support including cerium, the first washcoat layer being substantially free of a molecular sieve and being substantially free of barium and lanthanum and platinum; and
   the second washcoat layer comprising a second refractory oxide support, a platinum component and a molecular sieve, the second washcoat layer being substantially free of barium and lanthanum.

2. The oxidation catalyst composite of claim 1, wherein the first refractory metal oxide support further comprises one or more of alumina, silica, zirconia, titania and combinations thereof and the second refractory oxide support comprises one or more of alumina, silica, zirconia, titania and combinations thereof.

3. The oxidation catalyst composite of claim 1, wherein the molecular sieve comprises a zeolite.

4. The oxidation catalyst composite of claim 1, further comprising an undercoat layer containing substantially no precious group metal component.

5. The oxidation catalyst composite of claim 1, wherein the first washcoat extends over the entire length of the substrate and the second washcoat completely overlaps the first washcoat.

6. The oxidation catalyst composite of claim 1, wherein the first washcoat layer is upstream from and adjacent to the second washcoat layer along the length of the carrier substrate.

7. The oxidation catalyst composite of claim 6, wherein the first washcoat layer extends from the inlet end along about 5% to 95% of the length of the substrate and the second washcoat layer extends from the outlet along about 5% to 95% of the length of the substrate.

8. The oxidation catalyst composite of claim 7, wherein the first layer at least partially overlaps the second washcoat layer.

9. The oxidation catalyst composite of claim 7, wherein the second washcoat layer at least partially overlaps the first washcoat layer.

10. The oxidation catalyst composite of claim 1, wherein the platinum and palladium are present in a platinum to palladium ratio of from about 1:10 to about 10:1.

11. The oxidation catalyst composite of claim 1, wherein the platinum and palladium are present in a platinum to palladium ratio of from about 1:4 to about 2:1.

12. The oxidation catalyst composite of claim l, further comprising an undercoat layer containing substantially no precious group metal component.

13. The oxidation catalyst composite of claim 1, wherein the catalyst is effective to oxidize HC and CO emitted from an advanced combustion diesel engine, including a methane component, the first layer being active for oxidizing CO and HCs under high emission and low temperature conditions associated with advanced combustion diesel engine operation.

14. The oxidation catalyst composite of claim 1, wherein the first support comprises ceria and the molecular sieve comprises a zeolite selected from beta-zeolite, ZSM-5, zeolite-Y or combinations thereof.

15. The oxidation catalyst composite of claim 1, wherein the total loading of the platinum and palladium is in the range of about $30g/ft^3$ and $210g/ft^3$.

16. A method for treating a diesel exhaust gas stream or an advanced combustion diesel exhaust gas stream comprising contacting the exhaust gas stream with a diesel oxidation catalyst composite of claim 1.

17. The method of claim 16, further comprising directing the diesel exhaust gas stream to a soot filter located downstream of the diesel oxidation catalyst composite.

18. The method of claim 17, further comprising directing diesel exhaust gas to a selective catalytic reduction (SCR) catalytic article located downstream of the soot filter (CSF).

19. An diesel engine exhaust gas treatment system comprising:
a catalyst composite of claim 1; and
one or more of a soot filter, a catalyzed soot filter, a selective catalytic reduction (SCR) catalytic article and a $NO_x$ storage and reduction (NSR) catalytic article.

20. The oxidation catalyst composite of claim 1, wherein the first washcoat layer and the second washcoat layer are substantially free of magnesium and potassium.

21. An oxidation catalyst composite for abatement of exhaust gas emissions from an engine comprising:
a carrier substrate having a length, an inlet end and an outlet end, a diesel oxidation catalyst catalytic material on the carrier, the diesel oxidation catalyst catalytic material including a first washcoat layer and a second washcoat layer,
the first washcoat layer comprising a palladium (Pd) component supported by a first refractory metal oxide support including cerium, the first washcoat layer being substantially free of a molecular sieve and being substantially free of platinum; and
the second washcoat layer comprising a second refractory oxide support, a platinum component and a molecular sieve.

* * * * *